(12) United States Patent
Shi

(10) Patent No.: US 12,483,050 B2
(45) Date of Patent: Nov. 25, 2025

(54) CHARGING APPARATUS FOR AVOIDING A DAMAGE TO A CHARGING HEAD OF THE CHARGING APPARATUS AND A DEVICE

(71) Applicant: SHANGHAI UNITED IMAGING HEALTHCARE CO., LTD., Shanghai (CN)

(72) Inventor: Bo Shi, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 746 days.

(21) Appl. No.: 17/809,547

(22) Filed: Jun. 28, 2022

(65) Prior Publication Data

US 2022/0329090 A1 Oct. 13, 2022

Related U.S. Application Data

(63) Continuation of application No. PCT/CN2020/139946, filed on Dec. 28, 2020.

(30) Foreign Application Priority Data

Dec. 28, 2019 (CN) .......................... 201911383372.6
Dec. 28, 2019 (CN) .......................... 201922408287.2

(51) Int. Cl.
*H01M 10/46* (2006.01)
*A61B 6/00* (2006.01)
*H02J 7/00* (2006.01)

(52) U.S. Cl.
CPC .......... *H02J 7/0044* (2013.01); *A61B 6/4405* (2013.01); *A61B 6/56* (2013.01)

(58) Field of Classification Search
CPC .... H02J 7/0044; H02J 7/0042; H02J 2310/23; A61B 6/4405

(Continued)

(56) References Cited

U.S. PATENT DOCUMENTS

2012/0194132 A1 8/2012 Ikegame
2013/0134930 A1 5/2013 Konkle et al.
(Continued)

FOREIGN PATENT DOCUMENTS

CN 105982680 A 10/2016
CN 206498218 U 9/2017
(Continued)

OTHER PUBLICATIONS

Machine translation of CN 206498218U (Sep. 15, 2017) (Year: 2017).*

(Continued)

*Primary Examiner* — Edward Tso
(74) *Attorney, Agent, or Firm* — METIS IP LLC

(57) ABSTRACT

The present disclosure relates to a charging apparatus for a device that includes a charging port. The charging apparatus may include an accommodating case with an opening at a surface of the accommodating case. The opening may be configured such that the device may be capable of sliding into the accommodating case through the opening. And the charging apparatus may include a charging assembly disposed within the accommodating case. When the device slides into the accommodating case through the opening, if a side of the device with the charging port faces the charging assembly, at least a portion of the charging assembly may be capable of being plugged into the charging port; or if a side of the device without the charging port faces the charging assembly, the charging assembly may be capable of being compressed by the device.

19 Claims, 7 Drawing Sheets

(58) Field of Classification Search
USPC .................................. 320/107, 111, 114, 115
See application file for complete search history.

(56) References Cited

U.S. PATENT DOCUMENTS

| | | |
|---|---|---|
| 2015/0115173 A1 | 4/2015 | Kim |
| 2016/0120489 A1 | 5/2016 | Yang |
| 2020/0227928 A1 | 7/2020 | Matsumoto et al. |

FOREIGN PATENT DOCUMENTS

| | | |
|---|---|---|
| CN | 207059806 U | 3/2018 |
| CN | 209844122 U | 12/2019 |
| CN | 111030242 A | 4/2020 |
| CN | 211209340 U | 8/2020 |
| JP | 2011110199 A | 6/2011 |
| JP | 2012030060 A | 2/2012 |

OTHER PUBLICATIONS

International Search Report in PCT/CN2020/139946 mailed on Mar. 29, 2021, 5 pages.
Written Opinion in PCT/CN2020/139946 mailed on Mar. 29, 2021, 4 pages.
The Extended European Search Report in European Application No. 20907490.5 mailed on Mar. 15, 2023, 9 pages.
First Office Action in Chinese Application No. 201911383372.6 mailed on Aug. 21, 2024, 15 pages.

\* cited by examiner

CHARGING APPARATUS FOR AVOIDING A DAMAGE TO A CHARGING HEAD OF THE CHARGING APPARATUS AND A DEVICE

CROSS-REFERENCE TO RELATED APPLICATIONS

This application is a Continuation of International Application No. PCT/CN2020/139946, filed on Dec. 28, 2020, which claims priority of Chinese Patent Application No. 201911383372.6 filed on Dec. 28, 2019, and Chinese Patent Application No. 201922408287.2 filed on Dec. 28, 2019, the contents of each of which are incorporated herein by reference in their entirety.

TECHNICAL FIELD

The present disclosure generally relates to a charging apparatus.

BACKGROUND

At present, a device such as a medical terminal may need to be placed in a charging apparatus for charging. If the device is placed into the charging apparatus in a wrong direction, damage may be caused to a charging head of the charging apparatus and/or the device itself due to an impact between the charging head and the device. Therefore, it is desirable to provide a charging apparatus for charging the device in a better way.

SUMMARY

An aspect of the present disclosure relates to a charging apparatus for a device that includes a charging port. The charging apparatus may include an accommodating case with an opening at a surface of the accommodating case. The opening may be configured such that the device may be capable of sliding into the accommodating case through the opening. And the charging apparatus may further include a charging assembly disposed within the accommodating case. When the device slides into the accommodating case through the opening, if a side of the device with the charging port faces the charging assembly, at least a portion of the charging assembly may be capable of being plugged into the charging port; or if a side of the device without the charging port faces the charging assembly, the charging assembly may be capable of being compressed by the device.

In some embodiments, the charging apparatus may further include a base assembly connected to a bottom of the accommodating case. The charging assembly may be supported by the base assembly.

In some embodiments, the charging assembly may be elastically supported by the base assembly such that at least a portion of the charging assembly may be capable of extending out of a surface of the base assembly.

In some embodiments, the charging assembly may be elastically supported by the base assembly such that the charging assembly may be capable of retracting into the base assembly when being compressed by the device.

In some embodiments, the base assembly may include a guiding component. The charging assembly may penetrate through the guiding component and may be movable relative to the guiding component.

In some embodiments, the base assembly may further include a connecting component connected to a bottom of the guiding component and the bottom of the accommodating case, respectively.

In some embodiments, the base assembly may further include an elastic component configured to elastically connect the charging assembly and the base assembly.

In some embodiments, the elastic component may include one or more elastic units, and for each of the one or more elastic units, one end of the elastic unit may contact the charging assembly and another end of the elastic unit may contact the connecting component.

In some embodiments, the base assembly may include a positioning assembly configured to fix a position of the elastic component relative to the connecting component.

In some embodiments, the charging apparatus may further include a buffer assembly configured to change a movement speed of the device.

In some embodiments, an energy absorption of the buffer assembly may be in range of 2-5 Joules.

In some embodiments, a stroke of the buffer assembly may be in range of 8-12 millimeters.

In some embodiments, a distance between an inner wall of the accommodating case and a side surface of the device may be in range of 0.2-1.2 millimeters.

In some embodiments, the charging apparatus may further include a protective assembly disposed on the inner wall of the accommodating case. The protective assembly may be configured to reduce an abrasion of the device when the device moves relative to the accommodating case.

In some embodiments, the charging apparatus may further include a switch assembly. The switch assembly may be operable by the device to turn on the charging assembly.

In some embodiments, the device may include a flat panel detector.

An aspect of the present disclosure relates to a medical system including a charging apparatus for a device that includes a charging port. The charging apparatus may include an accommodating case with an opening at a surface of the accommodating case. The opening may be configured such that the device may be capable of sliding into the accommodating case through the opening. And the charging apparatus may further include a charging assembly supported within the accommodating case. When the device slides into the accommodating case through the opening, if a side of the device with the charging port faces the charging assembly, at least a portion of the charging assembly may be capable of being plugged into the charging port; or if a side of the device without the charging port faces the charging assembly, the charging assembly may be capable of being compressed by the device.

In some embodiments, the system may further include a medical device. The charging apparatus may be attached to the medical device.

In some embodiments, the medical device may include a mobile digital radiography device.

In some embodiments, the system may further include a power supply assembly configured to supply power to the charging apparatus.

In some embodiments, the power supply assembly may be removably attached to the medical device.

In some embodiments, the device may include a flat panel detector.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
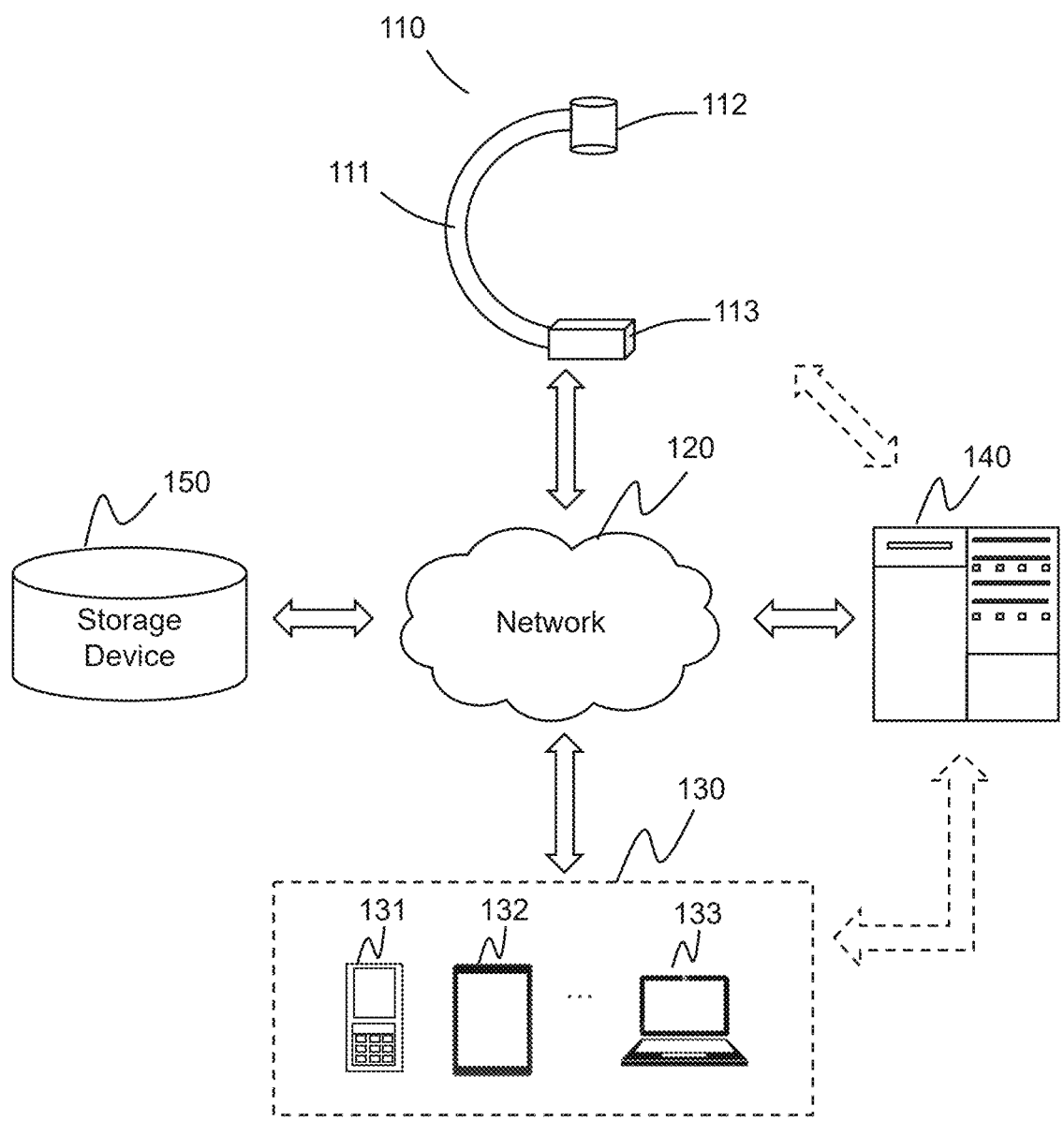
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Spatial and functional relationships between elements are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The present disclosure may provide a charging apparatus for a device (e.g., a flat panel detector of a mobile digital radiography device) and a medical system including the charging apparatus. The device may include a charging port on a side of the device. The charging apparatus may include an accommodating case with an opening at a surface (e.g., a top surface) of the accommodating case. The opening may be configured such that the device is capable of sliding into the accommodating case through the opening. The charging apparatus may further include a charging assembly disposed within the accommodating case. In some embodiments, the charging assembly may be elastically supported within the accommodating case. When the device slides into the accommodating case through the opening, if the side of the device with the charging port faces the charging assembly, at least a portion of the charging assembly may be plugged into the charging port. If a side of the device without the charging port faces the charging assembly, the charging assembly may be compressed by the device.

According to the charging apparatus provided in the present disclosure, the charging apparatus may be attached to a medical device (e.g., a mobile DR). In such cases, the device may be charged by the charging apparatus when needed, even when the medical device is moving. Furthermore, when the device slides into the accommodating case with a side without the charging port facing the charging assembly, the charging assembly may be compressed by the device due to the elastic support of the charging assembly, which may reduce or prevent a rigid collision between a surface of the device and the charging assembly, thereby preventing damage to the device and the charging assembly.

The following description is provided to facilitate better understanding of the charging apparatus. For illustration purposes, a medical system including the charging apparatus is described in the present disclosure. It should be noted that the description in connection with the medical system described below is merely provided as an example, and not intended to limit the scope of the present disclosure. For persons having ordinary skills in the art, the charging apparatus disclosed herein may be applied to any other components and/or devices to be charged.

FIG. 1 is a schematic diagram illustrating an exemplary medical system according to some embodiments of the present disclosure. As illustrated, the medical system 100 may include a medical device 110, a network 120, a terminal device 130, a processing device 140, and a storage device 150. The components of the medical system 100 may be connected in one or more of various ways. For example, the medical device 110 may be connected to the processing device 140 through the network 120. As another example, the medical device 110 may be connected to the processing device 140 directly (as indicated by the bi-directional arrow in dotted lines linking the medical device 110 and the processing device 140). As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The medical device 110 may scan a subject located within its detection region and generate or acquire data relating to the subject. In some embodiments, the subject may include a biological subject and/or a non-biological subject. For example, the subject may include a specific portion of a body, such as the head, the thorax, the abdomen, or the like, or a combination thereof. As another example, the subject may be a man-made composition of organic and/or inorganic matters that are with or without life. In some embodiments, the medical system 100 may include modules and/or components for performing imaging and/or related analysis. In some embodiments, the data relating to the subject may include projection data, scan data, one or more images of the subject, etc.

In some embodiments, the medical device 110 may be a medical imaging device for disease diagnostic or research purposes. The medical imaging device may include a single modality imaging device and/or a multi-modality imaging device. The single modality imaging device may include, for example, a digital radiography (DR) device (e.g., a mobile digital radiography device), a digital subtraction angiography (DSA) device, a dynamic spatial reconstruction (DSR) device, a magnetic resonance imaging (MRI) device, a positron emission tomography (PET) device, an emission computed tomography (ECT) device, a computed tomography (CT) imaging device, an X-ray imaging device, a molecular imaging (MI) device, a radiation therapy (RT) device, or the like, or any combination thereof. The multi-modality imaging device may include, for example, a computed tomography-magnetic resonance imaging (MRI-CT) device, a positron emission tomography-magnetic resonance imaging (PET-MRI) device, a single photon emission computed tomography-magnetic resonance imaging (SPECT-MRI) device, a digital subtraction angiography-magnetic resonance imaging (DSA-MRI) device, a computed tomography-positron emission tomography (CT-PET) device, or the like, or any combination thereof.

In some embodiments, the medical device 110 may include a gantry 111, an X-ray source 112, and a detector 113. The gantry 111 may be configured to support the X-ray source 112 and the detector 113. In some embodiments, the gantry 111 may have a C-shape as illustrated in FIG. 1. Alternatively, the gantry 111 may have a column-shape, an O-shape, a U-shape, a G-shape, or the like, or a combination thereof. The X-ray source 112 may emit one or more X-rays to the subject. In some embodiments, the X-ray source 112 may include a tube, such as a cold cathode ion tube, a high vacuum hot cathode tube, a rotating anode tube, etc. The tube may be powered by a high voltage generator, emitting X-rays that may be detected by the detector 113. The X-rays emitted by the X-ray source 112 may be guided to form a beam having the shape of a line, a narrow pencil, a narrow fan, a fan, a cone, a wedge, an irregular shape, or the like, or a combination thereof. The detector 113 may detect X-rays emitted from the X-ray source 112. In some embodiments, the detector 113 may be configured to produce an analog electrical signal that represents the intensity of the received X-rays, including the attenuated beam, as it passes through the subject. In some embodiments, the detector 113 may include one or more detector units. The detector units may include a scintillation detector (e.g., a cesium iodide detector), a gas detector, etc. The pixels of the detector may be represented by the number of the smallest detector units, e.g., the number of detector units. The detector units of the detector 113 may be arranged in a single row, two rows, or another number of rows.

In some embodiments, the detector 113 may be removably attached to the medical device 110 (e.g., mounted on the gantry 111). For example, the medical device 110 may include a mobile digital (DR) radiography device. The mobile DR device may move to a desirable position to perform a scan. Before and/or during a scanning process by the mobile DR device, the detector 113, e.g., a flat panel detector, may be mounted on one end of the gantry 111. The detector 113 may be removed from the gantry 111 when the scanning process is finished. In some embodiments, the detector 113 may be mounted on or accommodated in another component of the medical device 110 after being removed from the gantry 111. In some embodiments, the detector 113 may include a charging port. The detector 113 may be charged through the charging port.

In some embodiments, the medical system 100 may include a charging apparatus (not shown). The charging apparatus may be configured to charge one or more devices/components (e.g., the detector 113, the terminal device 130) of the medical system 100. For example, the charging apparatus may include an accommodating case and a charging assembly. The accommodating case may include an opening at a surface (e.g., a top surface) of the accommodating case. A device (e.g., the detector 113, the terminal device 130) may slide into the accommodating case through the opening. The charging assembly may be supported within (e.g., at the bottom of) the accommodating case. When the device slides into the accommodating case with its charging port facing the charging assembly, at least a portion (e.g., a charging head) of the charging assembly may be plugged into the charging port. In such cases, the device may be charged by the charging assembly. More descriptions regarding the charging apparatus may be found elsewhere in the present disclosure. See, e.g., FIGS. 2-6, and relevant descriptions thereof.

The network 120 may include any suitable network that can facilitate the exchange of information and/or data for the medical system 100. In some embodiments, one or more components (e.g., the medical device 110, the terminal device 130, the processing device 140, the storage device 150) of the medical system 100 may communicate with one or more other components of the medical system 100 via the network 120. For example, the terminal device 130 may control a movement of the medical device 110 (e.g., a mobile DR device) via the network 120. As another example, the terminal device 130 may control the operation of one or more components of the medical system 100 via the network 120. In some embodiments, the network 120 may be any type of wired or wireless network, or a combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the medical system 100 may be connected to the network 120 to exchange data and/or information.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the medical device 110 and/or the processing device 140 may be remotely operated through the terminal device 130. In some embodiments, the medical device 110 and/or the processing device 140 may be operated through the terminal device 130 via a wireless connection. In some embodiments, the terminal device 130 may receive information and/or instructions inputted by a user, and send the received information and/or instructions to the medical device 110 or the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

In some embodiments, the terminal device 130 may control the operation of one or more components of the medical system 100, such as the medical device 110. For example, a user may set an operating state of the medical device 110 and/or input parameters relating to the operation of the medical device 110 via the terminal device 130. As another example, a user may switch a power supply state (e.g., a power-on state, a power-off state, etc.) of the charging apparatus via the terminal device 130. In some embodiments, the terminal device 130 may be integrated into the medical device 110. For example, the terminal device 130 may be a control panel mounted on the medical device 110 configured to perform the functions of the terminal device 130 disclosed in this application. In some embodiments, the terminal device 130 may include a charging port. The terminal device 130 may be charged through the charging port. For example, the terminal device 130 may be operably connected to the charging apparatus by plugging the charging head of the charging apparatus into the charging port of the terminal device 130 so as to charge the terminal device 130.

The processing device 140 may process data and/or information obtained from the medical device 110, the terminal device 130, the storage device 150, and/or any other components associated with the medical system 100. For example, the processing device 140 may reconstruct an image based on projection data (or measurement data) collected or generated by the medical device 110. As another example, the processing device 140 may transmit an instruction to cause the medical device 110 to perform a medical treatment (e.g., a radiotherapy). As a further example, when a device is operably connected to the charging apparatus (e.g., a charging head of the charging apparatus being plugged into a charging port of the device), the processing device 140 may evaluate a battery level of the device and determine to charge the device when detecting that the battery level of the device is lower than a battery level threshold. In some embodiments, the processing device 140 may be a single server or a server group. The server group may be centralized or distributed. In some embodiments, the processing device 140 may be local or remote. For example, the processing device 140 may access information and/or data stored in or acquired by the medical device 110, the terminal device 130, the storage device 150, and/or any other components associated with the medical system 100 via the network 120. As another example, the processing device 140 may be directly connected to the medical device 110 (as illustrated by the bidirectional arrow in dashed lines connecting the processing device 140 and the medical device 110 in FIG. 1), the terminal device 130 (as illustrated by the bidirectional arrow in dashed lines connecting the processing device 140 and the terminal device 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data and/or instructions. In some embodiments, the storage device 150 may store data obtained from the medical device 110, the terminal device 130, and/or the processing device 140. For example, the storage device 150 may store scan data of a subject acquired by the medical device 110. In some embodiments, the storage device 150 may store data and/or instructions that the processing device 140 may execute or use to perform exemplary methods described in the present disclosure. For example, the storage device 150 may store instructions that the processing device 140 may execute to control a power supply state of the charging apparatus. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the medical device 110, the processing device 140, the terminal device 130) of the medical system 100. One or more components of the medical system 100 may access the data or instructions stored in the storage device 150 via the network 120. In some embodiments, the storage device 150 may be directly connected to or communicate with one or more components (e.g., the medical device 110, the processing device 140, the terminal device 130) of the Medical system 100. In some embodiments, the storage device 150 may be part of the processing device 140.

In some embodiments, the medical system 100 may further include a power supply assembly (not shown in FIG. 1). The power supply assembly may be configured to supply power to one or more components of the medical system 100. For example, the power supply assembly may include one or more power supplies. Each power supply may be operably connected to a component (e.g., the charging apparatus, the medical device 110, the processing device 140, the terminal device 130, the storage device 150) to supply power to the component. As another example, the power supply assembly may include one power supply operably connected to one or more components of the medical system 100. In some embodiments, the power supply assembly may be removably attached to the medical device 110. For example, the medical device 110 may include a mobile DR device. One or more other components (e.g., the charging apparatus, the processing device 140, the terminal device 130, the storage device 150) of the medical system 100 may be integrated into or installed on the mobile DR device. The power supply assembly may be attached to the mobile DR device and move with the mobile DR device. During an operation of the mobile DR device, the power supply assembly may supply power to one or more components of the mobile DR device. Optionally or additionally, the power supply assembly may be removed from the mobile DR device. For example, when the power supply assembly is out of power, it may be replaced with another power supply assembly. As another example, the power supply assembly may be removed from the mobile DR device and moved to a charging position for charging.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
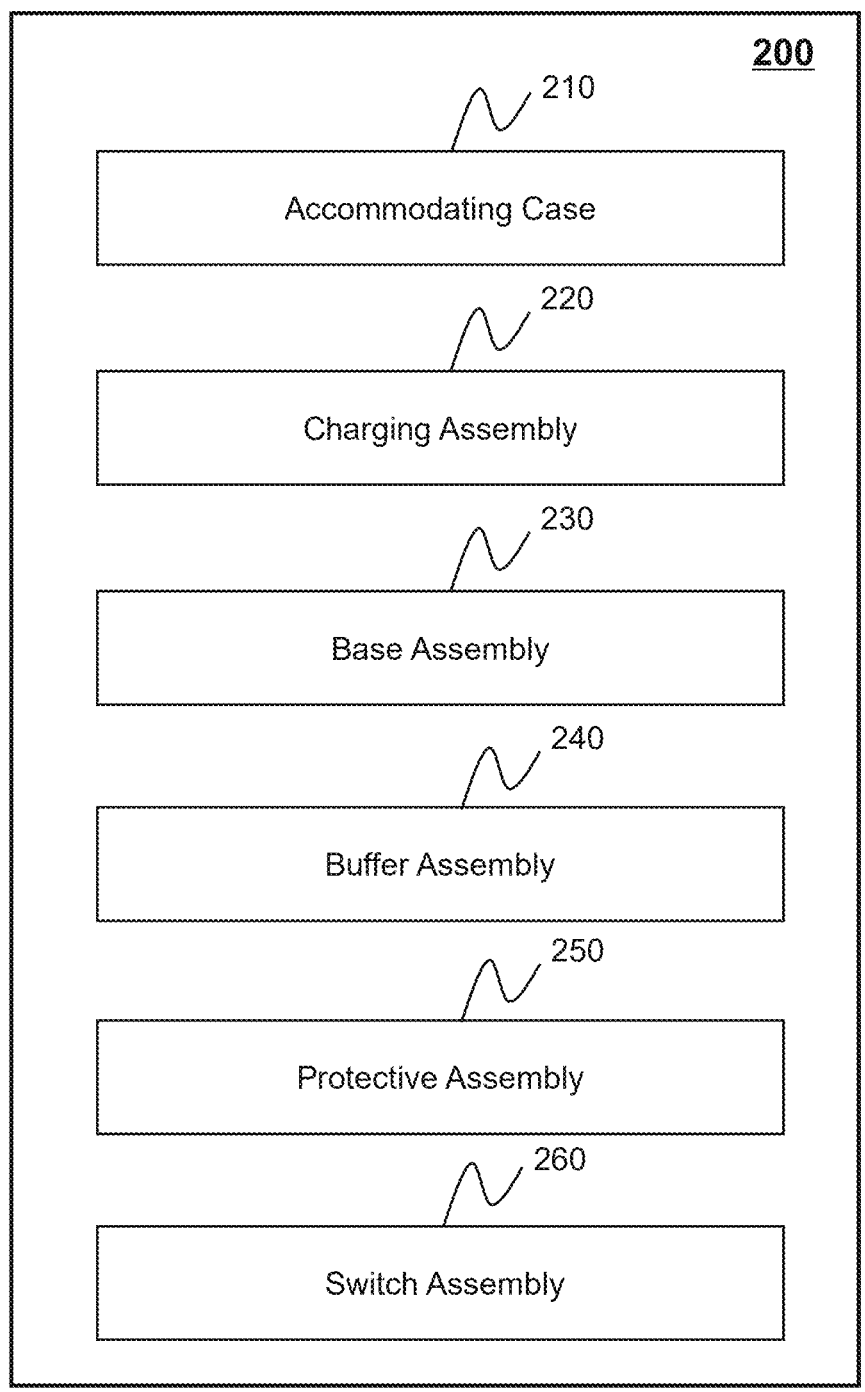
FIG. 2 is a schematic diagram illustrating exemplary components of an exemplary charging apparatus according to some embodiments of the present disclosure.

FIG. 2 is a schematic diagram illustrating exemplary components of an exemplary charging apparatus according to some embodiments of the present disclosure. The charging apparatus 200 may be used to charge devices. In some embodiments, the charging apparatus 200 may be used to charge one or more components (e.g., the detector 113, the terminal device 130) of the medical system 100. In some embodiments, the charging apparatus 200 may be attached to one or more components (e.g., the medical device 110) of the medical system 100. As illustrated in FIG. 2, the charging apparatus 200 may include an accommodating case 210, a charging assembly 220, a base assembly 230, a buffer assembly 240, a protective assembly 250, and a switch assembly 260.

The accommodating case 210 may be configured to accommodate a device (e.g., the detector 113, the terminal device 130). The accommodating case 210 may include an opening at a surface (e.g., a top surface) of the accommodating case. The device may slide into the accommodating case through the opening. In some embodiments, the accommodating case 210 may include an accommodating cavity accessible via the opening. When the device slides into the accommodating case through the opening, the device may be accommodated in the accommodating cavity. A shape of the accommodating cavity may conform to a shape of the device. When the device slides into the accommodating case, an inner wall(s) of the accommodating cavity may guide the sliding of the device. The inner wall(s) of the accommodating cavity may also function as an inner wall(s) of the accommodating case. For example, both the shape of the accommodating cavity and the shape of the device may be cuboids. A side surface(s) of the device may be substantially parallel to a corresponding inner wall(s) of the side surface(s) in the accommodating cavity. As used herein, "substantially" indicates that the deviation is below a threshold (e.g., 5%, 10%, 15%, 20%, 30%, etc.). For instance, a first surface (or wall) being substantially parallel to a second surface (or wall) indicates that the deviation of the angle between the first surface (or wall) and the second surface (or wall) from zero degrees is below a threshold. Merely by way of example, a first surface (or wall) being substantially parallel to a second surface (or wall) indicates that the angle between the first surface (or wall) and the second surface (or wall) is below 30°, or below 25°, or below 20°, or below 15°, or below 10°, or below 5°, etc. As used herein, an inner wall of the accommodating cavity corresponding to a side surface of a device refers to an inner wall of the accommodating cavity closest to the side surface of the device, compared to other side surfaces of the device. In some embodiments, a size of the accommodating cavity may be larger than a size of the device. For example, in a direction perpendicular to a sliding direction of the device, a perimeter of a cross section of the accommodating cavity may be larger than a perimeter of a cross section of the device. In such cases, the device may slide into the accommodating case smoothly. Additionally, a distance between the side surface(s) of the device and the corresponding inner wall(s) of the accommodating cavity may be less than a distance threshold or in a distance range. Merely by way of example, the distance may be in range of 0.2-1.2 millimeters (mm). In such cases, the device may be guided by the inner wall(s) of the accommodating cavity when sliding into the accommodating cavity. Then the device may be operably connected to a charging assembly (e.g., the charging assembly 220) supported within the accommodating case 210 successfully.

The charging assembly 220 may be configured to charge the device. For example, the device may include a charging port. The charging port may be located on a side of the device. When at least a portion of the charging assembly 220 (e.g., a charging head) is plugged into the charging port, the device may be charged by the charging assembly 220. In some embodiments, the charging assembly 220 may be operably connected to a power supply assembly (e.g., the power supply assembly illustrated in FIG. 1). The power supply assembly may be configured to supply power to the charging assembly 220. In some embodiments, the charging assembly 220 may be supported within the accommodating case 210. Merely by way of example, the charging assembly 220 may be supported at a bottom of the accommodating case 210. When the device slides into the accommodating case 210 through the opening, it may slide towards the charging assembly 220 at a certain speed under an action of gravity. In such cases, if the side of the device with the charging port faces the charging assembly 220 when the device slides into the charging assembly 220, at least a portion (e.g., the charging head) of the charging assembly 220 may be plugged into the charging port to establish an operable connection between the charging assembly 220 and the device. If a side of the device without the charging port faces the charging assembly 220 when the device slides into the charging assembly 220, the charging assembly 220 may be compressed by the device. For example, the charging assembly 220 may be elastically supported at the bottom of the accommodating case 210. The device may apply a pressure to the charging assembly 220 when contacting the charging assembly 220. Then the charging assembly 220 may be elastically retracted under the pressure.

The base assembly 230 may be configured to support the charging assembly 220. In some embodiments, the base assembly 230 may be positioned on a bottom of the accommodating case 210. As used herein, the bottom of the accommodating case 210 refers to a surface that is opposite to the opening of the accommodating case 210. As used herein, a top surface of the accommodating case 210 refers to a surface where the opening is located. The device may enter into the accommodating case 210 through the opening and slide toward the bottom of the accommodating case 210. In some embodiments, the accommodating case 210 may be oriented such that the opening and the bottom thereof are substantially along a vertical direction perpendicular to the floor. In some embodiments, the accommodating case 210 may be oriented such that the opening and the bottom thereof are substantially along a horizontal direction parallel to the floor. In some embodiments, the base assembly 230 may include a connecting component. The connecting component may be configured to attach the base assembly 230 to the bottom of the accommodating case 210. The connection between the connecting component and the accommodating case 210 may be achieved by a mechanical connection or a non-mechanical connection. Exemplary mechanical connections may include a welded connection, a key connection, a pin connection, an interference fit connection, an integrated molding, or the like, or any combination thereof. Exemplary non-mechanical connections may include an adhesive connection, a lashing connection, or the like, or any combination thereof.

In some embodiments, the charging assembly 220 may be elastically supported by the base assembly 230. For example, the base assembly 230 may include an elastic component. The elastic component may be configured to elastically connect the charging assembly 220 and the base assembly 230. For instance, the elastic component may include one or more elastic units. For each of the one or more elastic units, one end of the elastic unit may contact the charging assembly 220, and/or another end of the elastic unit may contact the connecting component. In some embodiments, the contact may be achieved by a mechanical connection or a non-mechanical connection as described elsewhere in the present disclosure. In some embodiments, the contact may be achieved by a force, e.g., the gravity of or another force by an assembly (e.g., the charging assembly 220, the base assembly 230) contacting the elastic component. The contacts on the two ends of an elastic component with the charging assembly 220 and the base assembly 230 may be the same or different. Merely by way of example, an elastic unit may include a spring contacting the charging assembly 220 and the base assembly 230, and one end of the elastic component may contact the base assembly 230 by a non-mechanical connection, while the other end of the elastic component may contact the charging assembly 220 by a non-mechanical connection. As another example, an elastic unit may include a spring leaf contacting the charging assembly 220 and the base assembly 230, and one end of the elastic component may contact the base assembly 230 by a mechanical or non-mechanical connection, while the other end of the elastic component may contact, due to the spring force in combination with the gravity of or another force by the charging assembly 220, the charging assembly 220 without a mechanical or non-mechanical connection. In such cases, the charging assembly 220 may be elastically supported by the connecting component of the base assembly 230. In some embodiments, when the charging assembly 220 is elastically supported by the base assembly 230, at least a portion (e.g., the charging head) of the charging assembly 220 may extend out of the base assembly 230. For example, the base assembly 230 may include a guiding component. The guiding component may include an opening on a surface of the guiding component (i.e., the surface of the base assembly 230). A bottom of the guiding component may be connected to the connecting component. A portion of the charging assembly 220 may be situated in the guiding component through the opening. Additionally, the charging assembly 220 may move relative to the guiding component. In such cases, the charging assembly 220 may retract, due to the presence of the elastic component of the base assembly 230, into the base assembly 230 when being compressed by the device. More descriptions regarding the base assembly 230 may be found elsewhere in the present disclosure (e.g., FIG. 5 and the description thereof).

The buffer assembly 240 may be configured to change a movement speed of the device. In some embodiments, the device may slide towards or collide into the charging assembly 220 at a high speed under an action of, e.g., gravity, a force exerted on the device by a user (e.g., when the user pushes the device into the accommodating case 210), which may cause an impact to the charging assembly 220, thereby damaging the device (e.g., the charging port) and/or the charging assembly 220 (e.g., the charging head). In some embodiments, the buffer assembly 240 may reduce the movement speed of the device and/or absorb at least part of the impact if the device collides into the charging assembly 220. In such cases, the impact on the contact surfaces between the device and the charging assembly 220 may be reduced, which may reduce or avoid damage to the device and/or the charging assembly 220 caused by the impact. More descriptions regarding the buffer assembly 240 may be found elsewhere in the present disclosure (e.g., FIG. 6, and the description thereof).

The protective assembly 250 may be configured to reduce an abrasion of the device when the device moves relative to the accommodating case 210. In some embodiments, when the device moves relative to the accommodating case 210, it may rub against the inner wall(s) of the accommodating case 210, which may cause an abrasion to the device and/or the accommodating case 210. The protective assembly 250 may be disposed between the inner wall(s) of the accommodating case 210 and the device. In some embodiments, the protective assembly 250 may be made of at least one soft material. Exemplary suitable soft materials may include polyurethane, rubber, or the like, or any combination thereof. During the movement of the device, the device may contact the protective assembly 250, instead of directly contacting the inner wall(s) of the accommodating case 210. In such cases, the abrasion of the device may be reduced. In some embodiments, the protective assembly 250 may also reduce the movement speed of the device when the device slides into the charging assembly 220, thereby reducing the impact on the contact surfaces between the device and the charging assembly 220.

The switch assembly 260 may be configured to control an electrical connection between the charging assembly 220 and a power supply assembly. In some embodiments, the device may cause the switch assembly 260 to turn on the charging assembly 220. For example, the device may press the switch assembly 260 when the device slides into the accommodating case 210. The charging assembly 220 may be turned on when the switch assembly 260 is pressed such that when the at least a portion of the charging assembly 220 is plugged into the charging port of the device, the device may be charged by the charging assembly 220.

It should be noted that the above description of the charging apparatus 200 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. In some embodiments, one or more other components may be included in the charging apparatus 200. For example, the charging apparatus 200 may include a control assembly. The control assembly may be configured to control the charging apparatus 200 to start or stop charging the device. For instance, the control assembly may detect a battery level of the device when the device is operably connected to the charging assembly 220. The control assembly may determine to charge the device when detecting that the battery level of the device is lower than a battery level threshold or stop charging the device when detecting that the battery level of the device exceeds another battery level threshold. As another example, the charging apparatus 200 may include a communication assembly. The communication assembly may be configured to transmit and/or broadcast reminder information (e.g., information relating to a connection status between the charging assembly 220 and the device, information relating to charging status of the device, the power level of the charging apparatus 200) to a user (e.g., a user of the device). In some embodiments, one or more components included in the charging apparatus 200 may be omitted. For example, the protective assembly 250 may be omitted. The accommodating case 210 may be made of at least one soft material so as to reduce an abrasion of the device when the device moves relative to the accommodating case. As another example, the switch assembly 260 may be omitted. The charging assembly 220 may be powered on automatically once the at least a portion of the charging assembly is plugged into the charging port of the device.

Figure 3:
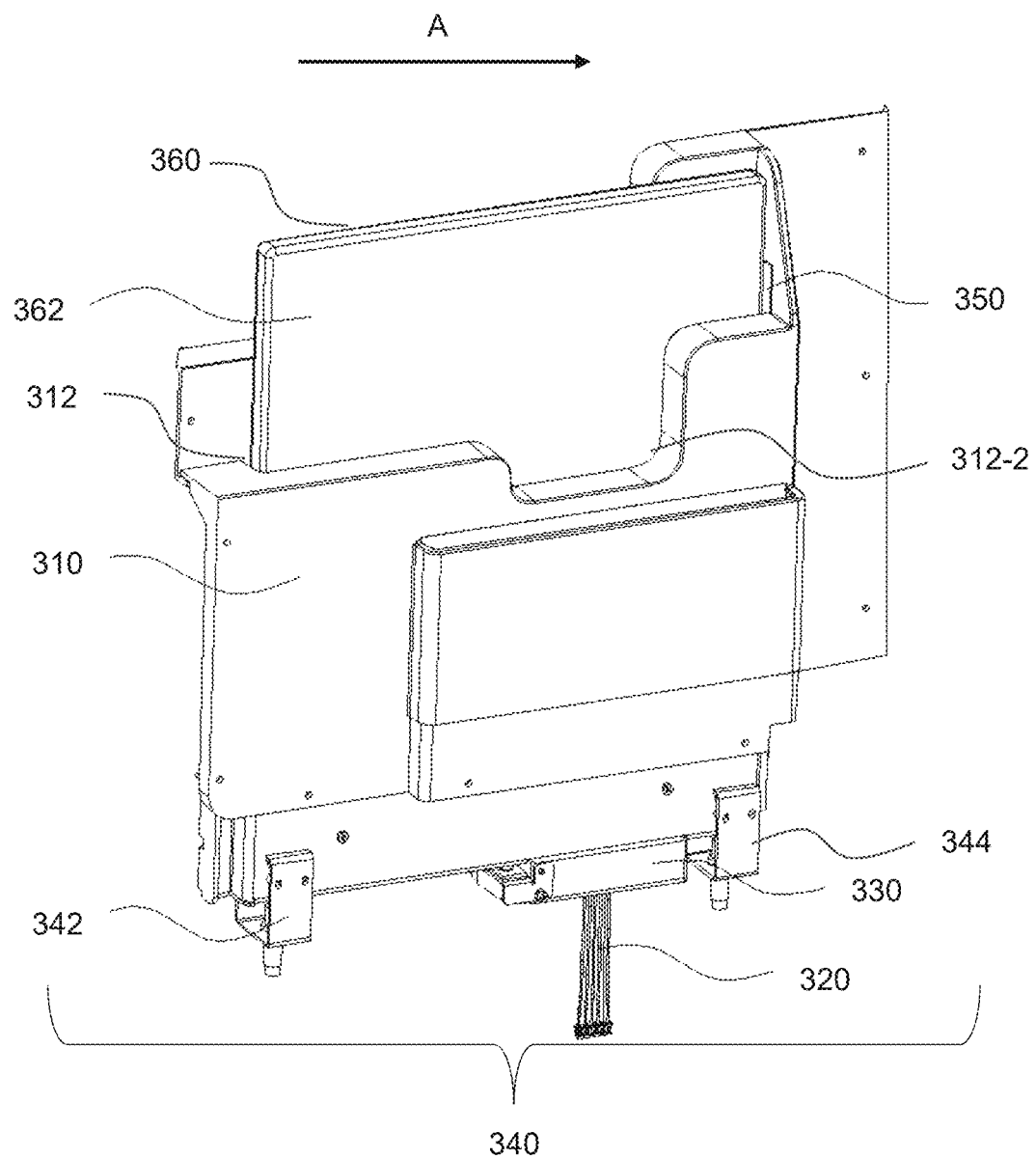
FIG. 3 is a schematic diagram illustrating an exemplary charging apparatus according to some embodiments of the present disclosure.

FIG. 3 is a schematic diagram illustrating an exemplary charging apparatus 300 according to some embodiments of the present disclosure. The charging apparatus 300 may be an exemplary embodiment of the charging apparatus as described in connection with FIG. 1 or the charging apparatus 200 as described in connection with FIG. 2. As illustrated in FIG. 3, the charging apparatus 300 may include an accommodating case 310, a charging assembly 320, a base assembly 330, a buffer assembly 340, and a protective assembly 350.

The accommodating case 310 may be configured to accommodate a device 360 (e.g., the detector 113, the terminal device 130). As illustrated in FIG. 3, the accommodating case 310 may have a frame-shaped structure with an opening on a top surface and an opening on the bottom. When the device 360 slides into the accommodating case 310 through the opening on the top surface, the device 360 may be accommodated in an accommodating cavity 312 of the accommodating case 310. An inner wall(s) of the accommodating cavity 312 may guide the sliding of the device 360. The inner wall(s) of the accommodating cavity 312 may also function as an inner wall(s) of the accommodating case 310. In some embodiments, a shape of the accommodating cavity 312 may conform to a shape of the device 360. For example, both the shape of the accommodating cavity 312 and the shape of the device 360 may be cuboids. A side surface(s) (e.g., the side surface 362 illustrated in FIG. 3) of the device 360 may be substantially parallel to a corresponding inner wall(s) (e.g., the inner wall 312-2 illustrated in FIG. 3) of the accommodating cavity 312.

In some embodiments, a size of the accommodating cavity 312 may be larger than a size of the device 360. For example, in a direction perpendicular to a sliding direction of the device (e.g., direction A as illustrated in FIG. 3), a perimeter of a cross section of the accommodating cavity 312 may be larger than a perimeter of a cross section of the device 360. In such cases, the device 360 may slide into the accommodating case 310 smoothly. Additionally, a distance between the side surface(s) of the device 360 and the corresponding inner wall(s) of the accommodating cavity 312 may be in a distance range. Merely by way of example, the distance may be in range of 0.2-1.2 millimeters (mm). In such cases, the device 360 may be guided by the inner wall(s) of the accommodating cavity 312 when sliding into the accommodating cavity 312. Then the device 360 may be operably connected to a charging assembly (e.g., the charging assembly 320) supported within the accommodating case 310 successfully. For example, when the device 360 is sliding into the accommodating case 310, a charging port of the device 360 may be completely facing a charging head of the charging assembly 320. Then the charging head may be plugged into the charging port successfully. In some embodiments, the accommodating case 310 may be attached to an external device. For example, the accommodating case 310 may be attached to one or more components (e.g., the medical device 110) of the medical system 100 via a mechanical connection. Optionally or additionally, the connection between the accommodating case 310 and the external device may be removable.

The charging assembly 320 may be configured to charge the device 360. The charging port may be located on a side of the device 360. As illustrated in FIG. 3, the charging assembly 320 may be supported at the bottom of the accommodating case 310 by the base assembly 330. When the device 360 slides into the accommodating case 310 through the opening, it may slide towards the charging assembly 320 at a certain speed under an action of gravity. In such cases, if the side of the device 360 with the charging port faces the charging assembly 320 when the device 360 slides into the charging assembly 320, at least a portion (e.g., the charging head) of the charging assembly 320 may be plugged into the charging port to establish an operable connection between the charging assembly 320 and the device 360. The device 360 may be charged by the charging assembly 320. If a side of the device 360 without the charging port faces the charging assembly 320 when the device 360 slides into the charging assembly 320, the charging assembly 320 may be compressed by the device 360. For example, the charging assembly 320 may be elastically supported at the bottom of the accommodating case 310. The device 360 may apply a pressure to the charging assembly 320 when contacting the charging assembly 320. Then the charging assembly 320 may be elastically retracted under the pressure. In some embodiments, the charging assembly 320 may be operably connected to a power supply assembly (e.g., the power supply assembly illustrated in FIG. 1). The power supply assembly may be configured to supply power to the charging assembly 320. For example, the charging assembly 320 may include or be operably connected to a wire component. The charging assembly 320 may be operably connected to the power supply assembly via the wire component.

The base assembly 330 may be configured to support the charging assembly 320. As illustrated in FIG. 3, the base assembly 330 may be positioned on the bottom of the accommodating case 310. In some embodiments, the base assembly 330 may be connected to the bottom of the accommodating case 310 via a mechanical connection. Exemplary mechanical connections may include a welded connection, a key connection, a pin connection, an interference fit connection, an integrated molding, or the like, or any combination thereof. In some embodiments, the charging assembly 320 may be elastically supported by the base assembly 330 such that at least a portion (e.g., the charging head) of the charging assembly 320 may extend out of the base assembly 330. In such cases, when the device 360 slides into the accommodating case 310 through the opening, it may slide towards the charging assembly 320 at a certain speed under an action of gravity. If the side of the device 360 with the charging port faces the charging assembly 320, the at least a portion of the charging assembly 320 may be plugged into the charging port. If a side of the device 360 without the charging port faces the charging assembly 320, the charging assembly 320 may be elastically compressed by the device 360. Then the charging assembly 320 may retract into the base assembly 330, which may reduce or prevent a rigid collision between a surface of the device 360 and the charging assembly 320, thereby preventing damage to the device 360 and the charging assembly 320. More descriptions regarding the base assembly 330 may be found elsewhere in the present disclosure (e.g., FIG. 5 and the description thereof).

The buffer assembly 340 may be configured to change a movement speed of the device 360. In some embodiments, the device 360 may slide towards or collide into the charging assembly 320 at a high speed under an action of, e.g., gravity, a force exerted on the device 360 by a user (e.g., when the user pushes the device 360 into the accommodating case 310), which may cause an impact to the charging assembly 320, thereby damaging the device 360 and/or the charging assembly 320. The buffer assembly 340 may reduce the movement speed of the device 360 and/or absorb at least part of the impact if the device 360 collides into the accommodating case 310, which may reduce or avoid damage to the device 360 and/or the charging assembly 320 caused by the impact. As illustrated in FIG. 3, the buffer assembly 340 may include two buffer components (e.g., the buffer component 342, the buffer component 344). The two buffer components may be positioned on the bottom of the accommodating case 310. In some embodiments, the two buffer components may be arranged symmetrically with respect to a center point of the bottom. In such cases, the movement of the device 360 may be evenly buffered by the two buffer components. Then the device 360 may slide to the charging assembly 320 stably without deviation. More descriptions regarding the buffer component may be found elsewhere in the present disclosure (e.g., FIG. 7, and the description thereof).

The protective assembly 350 may be configured to reduce an abrasion of the device 360 when the device 360 moves relative to the accommodating case 310. In some embodiments, the protective assembly 350 may be disposed between the inner wall(s) of the accommodating case 310 and the device 360. As illustrated in FIG. 3, the protective assembly 350 may include a protective tape. The protective tape may be attached to the inner wall(s) of the accommodating case 310. For example, the protective tape may be attached to the inner wall(s) of the accommodating case 310 via an adhesive connection. In some embodiments, an area of the protective tape may be approximately the same as an area of the inner wall(s) such that the protective tape may completely cover the inner wall(s) of the accommodating case 310. In some alternative embodiments, the protective tape may include a plurality of thin tapes that are attached to the inner wall(s) of the accommodating case 310 at even or uneven intervals.

In some embodiments, the protective assembly 350 may be made of at least one soft material. Exemplary suitable soft materials may include polyurethane, rubber, or the like, or any combination thereof. During the movement of the device 360, the device 360 may contact the protective assembly 350, instead of directly contacting the inner wall(s) of the accommodating case 310. In such cases, the abrasion of the device 360 may be reduced. Merely by way of example, the protective assembly 350 may be made of polyurethane. A thickness of the protective assembly 350 may be 0.8 mm. The protective assembly 350 may be attached to four inner walls of the accommodating case 310 having the frame-shaped structure illustrated in FIG. 3. The polyurethane may be soft such that the abrasion of the device 360 may be reduced. Additionally, the polyurethane may be wear-resistant such that the protective tape may have a long service life. As another example, the protective assembly 350 may be made of rubber. The rubber may have a relatively small hardness such that the abrasion of the device 360 may be reduced. In some embodiments, a thickness of the protective assembly 350 may be determined based on a property (e.g., a wear resistance, a hardness) of the material. For example, if the protective assembly 350 is made of a material with a high wear resistance, the thickness of the protective assembly 350 may be relatively small. As another example, if the protective assembly 350 is made of a material with a relatively high hardness, the thickness of the protective assembly 350 may be relatively small such that the protective assembly 350 may be easily attached to the device.

In some embodiments, a distance between a side surface(s) of the device 360 and a corresponding surface of the protective assembly 350 may be less than a distance threshold or in a predetermined distance range. As used herein, a surface of the protective assembly 350 corresponding to a side surface of the device 360 refers to a surface of the protective assembly 350 closest to the side surface of the device 360, compared to other side surfaces of the device 360. Merely by way of example, the distance may be in range of 0.2-1.2 millimeters (mm). In such cases, the device 360 may slide into the accommodating case 310 smoothly and may be guided by the surface(s) of the protective assembly 350 when sliding into the accommodating cavity 312. Correspondingly, a distance between the side surface(s) of the device 360 and the corresponding inner wall(s) of the accommodating cavity 312 may be determined based on the distance between the side surface(s) of the device 360 and a surface of the protective assembly 350, and a thickness of the protective assembly 350. For example, if the thickness of the protective assembly 350 is 0.8 mm, the distance between the side surface(s) of the device 360 and the corresponding inner wall(s) of the accommodating cavity 312 may be in range of 1-2 mm.

It should be noted that the example illustrated in FIG. 3 and the above description thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the charging apparatus 300 may include one or more additional components and/or one or more components of the charging apparatus 300 described above may be omitted. For example, the charging apparatus 300 may include a switch assembly configured to control an electrical connection between the charging assembly 320 and a power supply assembly. As another example, the protective assembly 350 may be omitted. The accommodating case 310 may be made of least one soft material so as to reduce an abrasion of the device 360 when the device 360 moves relative to the accommodating case 310.

In addition, the position, the shape, and/or the size of a component of the charging apparatus 300 as shown in FIG. 3 are illustrative, and the component may be mounted at any position and have any size and/or shape. Moreover, a connection between two components as illustrated in figures and described above may be variable. For example, the connection may be a mechanical connection or a non-mechanical connection.

Figure 4:
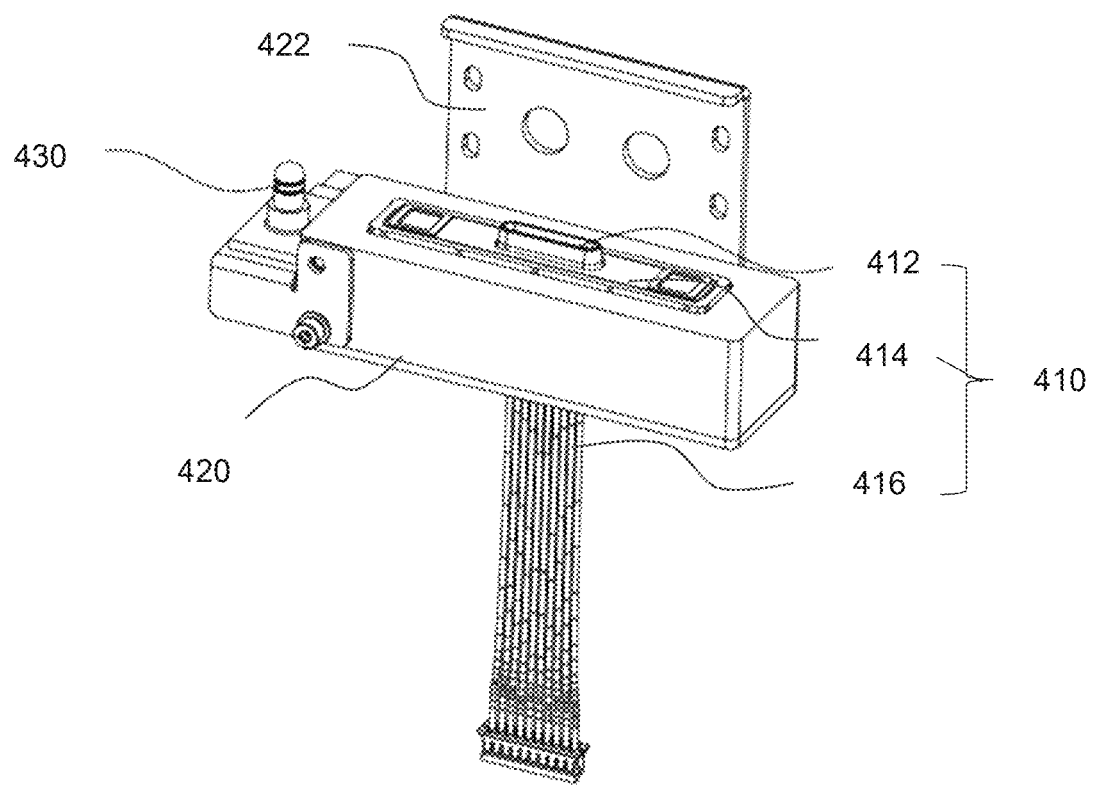
FIG. 4 is a schematic diagram illustrating an exemplary charging assembly and an exemplary base assembly according to some embodiments of the present disclosure.

FIG. 4 is a schematic diagram illustrating an exemplary charging assembly and an exemplary base assembly according to some embodiments of the present disclosure.

As illustrated in FIG. 4, the charging assembly 410 may be supported by the base assembly 420. The charging assembly 410 may include a charging head 412, a body 414, and a wire component 416. The charging head 412 may extend out of the base assembly 420. In some embodiments, the charging head 412 may be plugged into a charging port of a device so as to charge the device. The body 414 may be positioned in the base assembly 420. In some embodiments, the body 414 may be elastically supported by the base assembly 420 such that the charging assembly 410 may retract into the base assembly 420 when being compressed. The wire component 416 may be operably connected to a power supply assembly (not shown in FIG. 4). The power supply assembly may be configured to supply power to the charging assembly 410. In some embodiments, the base assembly 420 may be connected to an external device. For example, the base assembly 420 may be connected to the bottom of the accommodating case 310 illustrated in FIG. 3 via a connecting component 422. If the device slides into the accommodating case 310 with the charging port facing the charging assembly 410, the charging head 412 may be plugged into the charging port.

In some embodiments, as illustrated in FIG. 4, a switch assembly 430 may be operably connected to the base assembly 420. The switch assembly 430 may be configured to control an electrical connection between the charging assembly 410 and the power supply assembly. The switch assembly 430 may be operable by the device to turn on the charging assembly 410. For illustration purposes, a top surface of the switch assembly 430 may be higher than a top surface of the charging head 412. The device may contact and/or press the switch assembly 430 before the charging head 412 is plugged into the charging port of the device. In such cases, when the charging head 412 is plugged into the charging port of the device, the charging assembly 410 may already be turned on. The charging assembly 410 may be turned on without additional operations (e.g., an operation by a user to turn on the charging assembly 410), which may simplify the charging process. In some embodiments, the switch assembly 430 may include a reset micro switch. The reset micro switch may reset automatically when the device is removed from the charging assembly 410. Correspondingly, the charging assembly 410 may be turned off without additional operations (e.g., an operation by a user to turn off the charging assembly 410), which may improve the safety and convenience of the charging process.

It should be noted that the example illustrated in FIG. 4 and the above description thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the charging assembly 410 and/or the base assembly 420 may include one or more additional components and/or one or more components of the charging assembly 410 and/or the base assembly 420 described above may be omitted. In addition, the position, the shape, and/or the size of a component as shown in FIG. 4 are illustrative, and the component may be mounted at any position and have any size and/or shape. For example, the switch assembly 430 may be mounted on the bottom of the accommodating case 310 directly.

Figure 5:
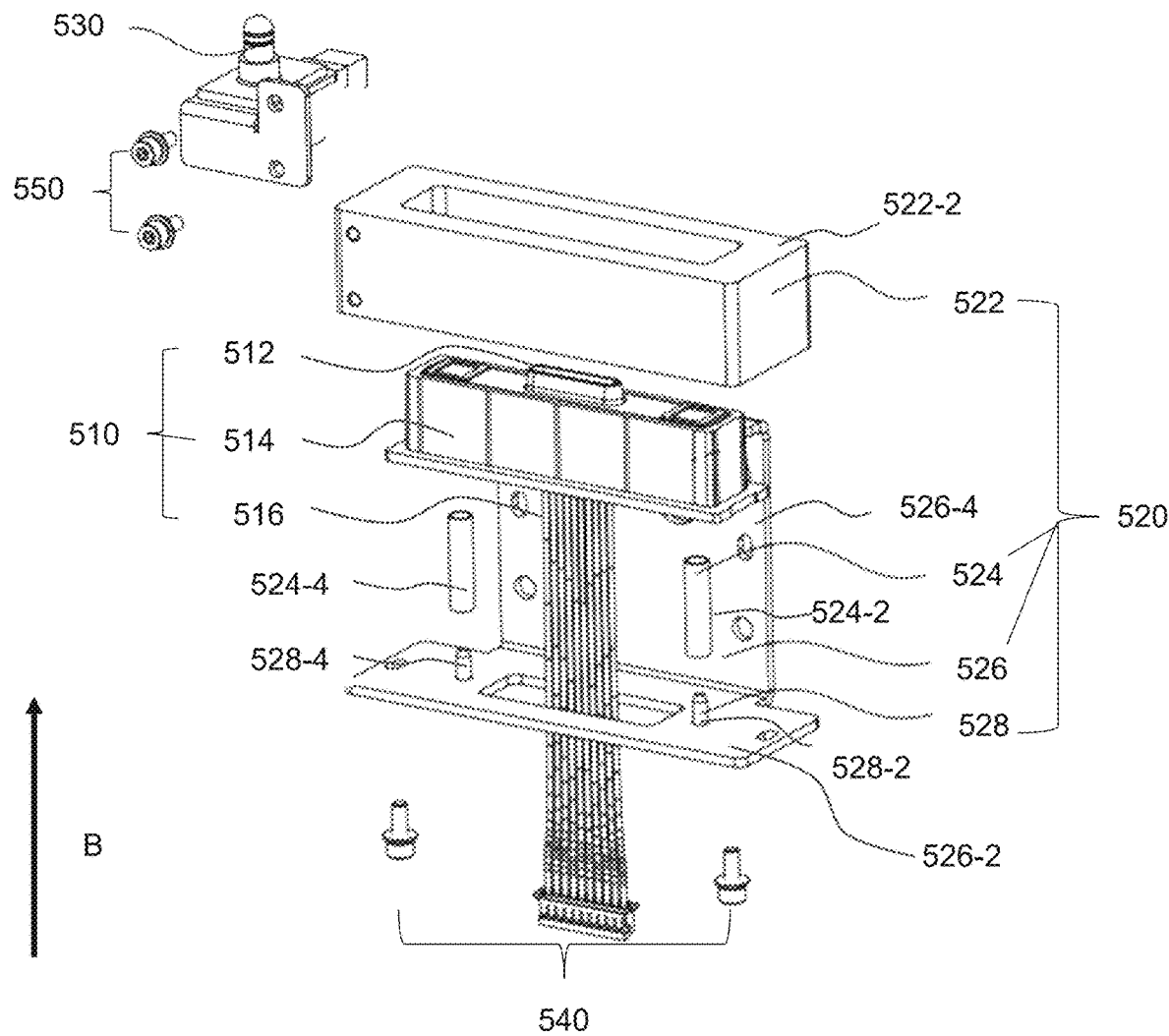
FIG. 5 is an exploded diagram of an exemplary charging assembly and an exemplary base assembly according to some embodiments of the present disclosure.

FIG. 5 is an exploded diagram of an exemplary charging assembly and an exemplary base assembly according to some embodiments of the present disclosure. As illustrated in FIG. 5, the charging assembly 510 may include a charging head 512, a body 514, and a wire component 516. The base assembly 520 may include a guiding component 522, an elastic component 524, a connecting component 526, and a positioning assembly 528.

The charging assembly 510 may penetrate through the guiding component 522. Specifically, as illustrated in FIG. 5, the body 514 may be approximately a rectangular. The guiding component 522 may have a cylindrical structure similar to the shape of the body 514. The body 514 may be accommodated in the guiding component 522. A top surface 522-2 of the guiding component 522 may include an opening. The charging head 512 may extend out of the guiding component 522 through the opening. In some embodiments, the charging assembly 510 may move relative to the guiding component 522. For example, the charging assembly 510 may move in a same direction as a device to be charged slides (e.g., a direction B illustrated in FIG. 5). The guiding component 522 may be configured to guide the movement of the charging assembly 510 so as to reduce or prevent a deviation of the charging assembly 510. In such cases, when the device slides into an accommodating case including the charging assembly 510, the charging head 512 may face a charging port of the device. Then the charging head 512 may be plugged into the charging port successfully.

A bottom of the guiding component 522 may be connected to the connecting component 526. For example, the connecting component 526 may include a bottom surface 526-2 and a side surface 526-4. The bottom of the guiding component 522 may be connected to the bottom surface 526-2 via a screw assembly 540. In some embodiments, the connecting component 526 may be further connected to an external device (e.g., an accommodating case). For example, the side surface 526-4 of the connecting component 526 may be connected to a bottom of the accommodating case. In some embodiments, a connection position of the connecting component 526 may be adjusted according to a position of the charging port of the device. For example, a position of the charging port may be determined when the device slides to the bottom of the accommodating case. The connection position of the connecting component 526 may be adjusted to facing the charging port such that the charging head 512 may be plugged into the charging port exactly. In some embodiments, the switch assembly 530 may be connected to the guiding component 522 via a screw assembly 550.

The elastic component 524 may be configured to elastically connect the charging assembly 510 and the base assembly 520. For example, as illustrated in FIG. 5, the elastic component 524 may include one or more elastic units (e.g., the elastic unit 524-2, the elastic unit 524-4). For each elastic unit, one end of the elastic unit may contact the body 514 of the charging assembly 510. Another end of the elastic unit may contact the connecting component 526 (e.g., the bottom surface 526-2). In some embodiments, the contact may be achieved by a force, e.g., the gravity of or another force by an assembly (e.g., the charging assembly 510, the base assembly 520) contacting the elastic component 524. The contacts on the two ends of the elastic component 524 with the charging assembly 510 and the base assembly 520 may be the same or different. More descriptions regarding the contact may be found elsewhere in the present disclosure. See, e.g., FIG. 2 and relevant descriptions thereof. In such cases, the charging assembly 510 may be elastically supported by the base assembly 520. In some embodiments, the one or more elastic units may be arranged symmetrically with respect to a center point of the bottom surface 526-2 so as to balance the charging assembly 510. In some embodiments, the elastic component 524 may be include components having elastic structures and/or be components made of elastic materials. For example, the elastic component 524 may include springs. As another example, the elastic component 524 may be made of rubber.

In some embodiments, when the elastic component 524 is in an initial compression state (e.g., compressed by charging assembly 510), the charging assembly 510 may be elastically supported by the elastic component 524 such that the charging head 512 may extend out of the guiding component 522. When the device slides into the accommodating case with a side without the charging port facing the charging assembly 510, the charging assembly 510 may be pressed down by the device. Further, the elastic component 524 may be compressed and retracted. In such cases, the charging assembly 510 may retract into the base assembly 520, which may reduce or prevent a rigid collision between a surface of the device and the charging assembly 510, thereby preventing damage to the device and the charging assembly 510. Furthermore, when the device is taken out of the accommodating case, the elastic component 524 may return to the initial compression state. The charging head 512 may extend out of the guiding component 522. When the device slides into the accommodating case with the side with the charging port facing the charging assembly 510, the charging assembly 510 may be plugged into the charging port.

The positioning assembly 528 may be configured to fix a position of the elastic component 524 relative to the connecting component 526. For example, the positioning assembly 528 may be provided such that the elastic component 524 may not shift relative to the connecting component 526 during a compression and/or a restoration of the elastic component 524. In such cases, the charging assembly 510 may move stably and/or accurately when extending out of and/or retracting into the base assembly 520, thereby reducing or preventing a deviation of the charging assembly 510. Merely by way of example, as illustrated in FIG. 5, the positioning assembly 528 may include one or more positioning units (e.g., the positioning unit 528-2, the positioning unit 528-4) corresponding to the one or more elastic units. The positioning units may be connected to the bottom surface 526-2 of the connecting component 526. During the compression and/or the restoration of the elastic component 524, the elastic component 524 may move along the positioning assembly 528 in the direction B. Correspondingly, the charging assembly 510 may move consistently with the elastic component 524 without deviation.

In some embodiments, a type of the positioning assembly 528 may correspond to a type of the elastic component 524. For example, the elastic component 524 may include springs. The positioning assembly 528 may include pins. Each spring may be sleeved on a pin. As another example, the elastic component 524 may include cylindrical components made of rubber. The positioning assembly 528 may include sleeves. Each cylindrical component may be inserted into a sleeve.

It should be noted that the example illustrated in FIG. 5 and the above description thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the charging assembly 510 and/or the base assembly 520 may include one or more additional components and/or one or more components of the charging assembly 510 and/or the base assembly 520 described above may be omitted.

In addition, the position, the shape, and/or the size of a component of the charging assembly 510 and/or the base assembly 520 as shown in FIG. 5 are illustrative, and the component may be mounted at any position and have any size and/or shape. Moreover, a connection between two components as illustrated in figures and described above may be variable.

Figure 6:
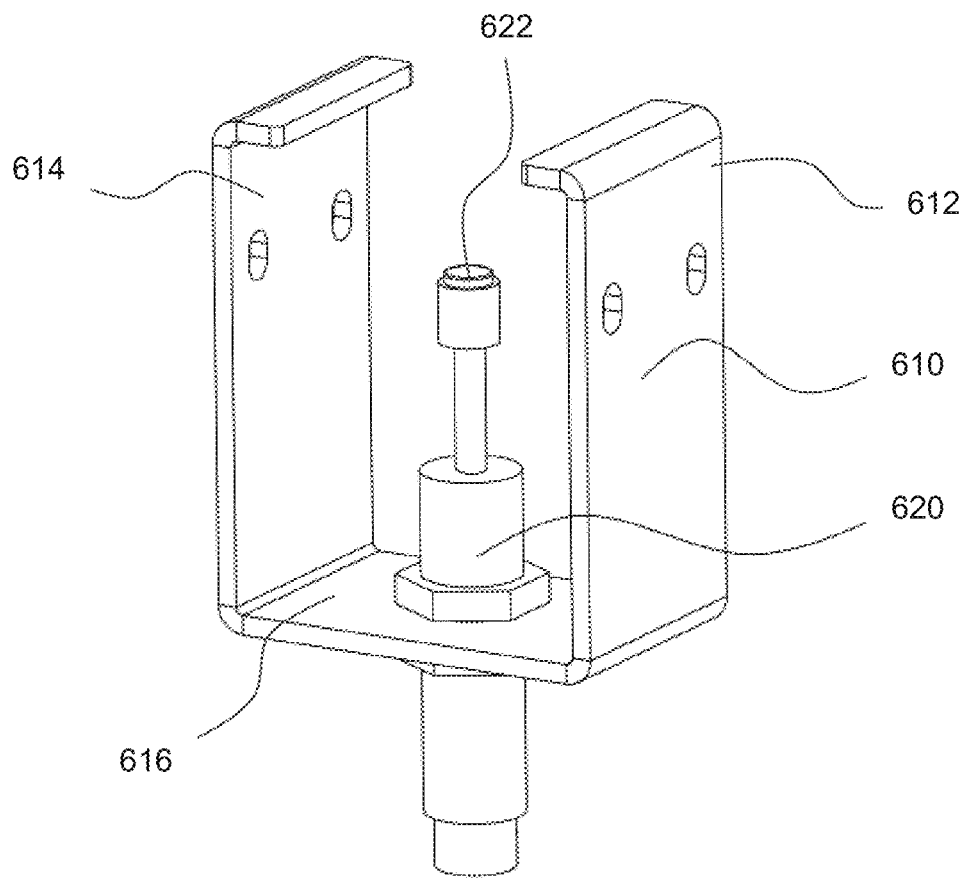
FIG. 6 is a schematic diagram illustrating an exemplary buffer assembly according to some embodiments of the present disclosure.

FIG. 6 is a schematic diagram illustrating an exemplary buffer assembly according to some embodiments of the present disclosure. In some embodiments, the buffer assembly 600 may be positioned on a bottom of an accommodating case. In some embodiments, the buffer assembly 600 may be configured to change a movement speed of the device when the device slides into or collide into the accommodating case. As illustrated in FIG. 6, the buffer assembly 600 may include a frame 610 and a buffer 620.

The frame 610 may be configured to support the buffer 620. For example, as illustrated in FIG. 6, the frame 610 may include a side wall 612, a side wall 614, and a bottom 616. The buffer 620 may be supported on the bottom 616 (e.g., at a center point on the bottom 616). The side wall 612 and/or the side wall 614 may be connected to the bottom of the accommodating case such that the buffer 620 may be attached to a bottom of an accommodating case. Merely by way of example, as illustrated in connection with FIG. 3, two side walls of a buffer assembly (e.g., the buffer component 342, the buffer component 344 illustrated in FIG. 3) may be mechanically connected to two opposite outer side walls at the bottom of an accommodating case (e.g., the accommodating case 310), respectively, and a buffer of the buffer assembly may be accommodated in an accommodating cavity (e.g., the accommodating cavity 312) of the accommodating case. Optionally or additionally, the frame 610 may include a sheet metal.

The buffer 620 may be configured to reduce or absorb an impact caused by the device, which may reduce the movement speed of the device, thereby reducing or avoiding the damage to the device and/or a charging assembly caused by the impact. In some embodiment, a top surface 622 of the buffer 620 may be higher than a top surface of the charging assembly. As used herein, the top surface 622 of the buffer 620 refers to a surface closest to the opening of the accommodating case, compared to other surfaces of the buffer 620. The top surface of the charging assembly refers to a surface closest to the opening of the accommodating case, compared to other surfaces of the charging assembly. When the device slides into the accommodating case, the device may first contact the top surface 622 of the buffer 620. The movement speed of the device may be reduced by the buffer 620 before the device contacts the top surface of the charging assembly. In such cases, the impact caused by the device may be reduced, thereby reducing or avoiding damage to the device and/or the charging assembly. In some embodiment, the device may still move at a certain speed after passing through the buffer 620 such that the charging assembly may be plugged into the charging port. Correspondingly, an energy absorption and/or a stroke of the buffer 620 may be in a certain range such that the device may retain the certain speed. In some embodiment, the energy absorption of the buffer 620 may be in range of 2-5 Joules. In some embodiment, the stroke of the buffer 620 is in range of 8-12 millimeters. In some embodiment, the buffer 620 may be made of at least one elastic material and/or include at least one buffer structure which may have a damping capacity. For example, at least a portion of the buffer 620 may be made of rubber. As another example, the buffer 620 may include at least one spring component, or at least one buffer component including a buffer material (e.g., a gas, a liquid). In such cases, when the device contact and/or impact the buffer 620, at least a portion of the buffer 620 may be compressed due to the damping capacity, which may reduce or absorb the impact caused by the device, thereby reducing the movement speed of the device. Further, when the device is taken out of the accommodating case, the at least a portion of the buffer 620 compressed by the device may return to an initial state. Optionally or additionally, the buffer 620 may include a hydraulic damping buffer.

Figure 7:
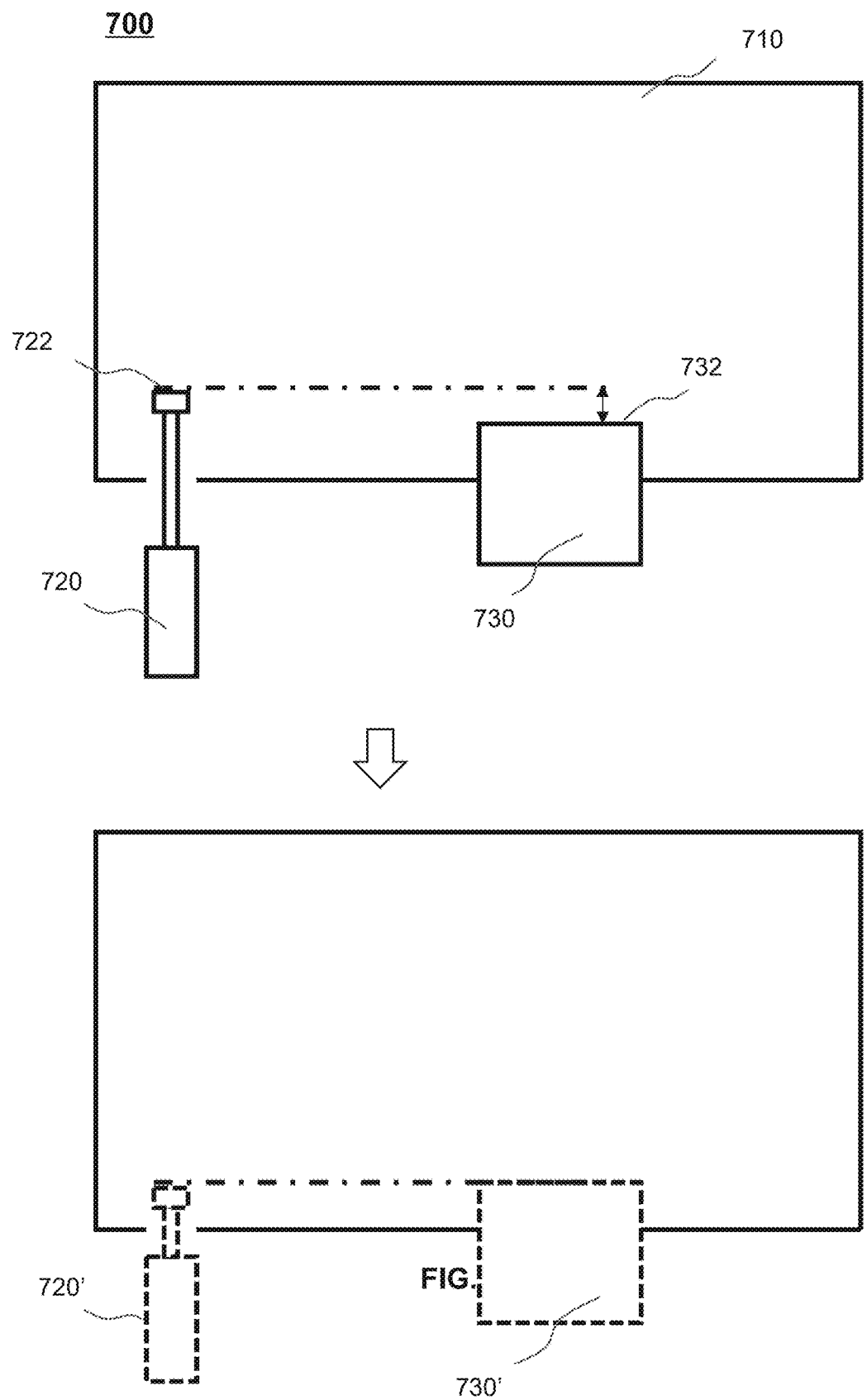
FIG. 7 is a schematic diagram illustrating an exemplary relationship between a buffer and a charging assembly according to some embodiments of the present disclosure.

Merely by way of example, FIG. 7 is a schematic diagram illustrating an exemplary relationship between a buffer 720 and a charging assembly 730 according to some embodiments of the present disclosure. In some embodiments, both the buffer 720 and the charging assembly 730 may be positioned on a bottom of an accommodating case. In some embodiments, the charging assembly 730 may be elastically supported within the accommodating case. As illustrated in FIG. 7, the buffer 720 may be in an initial state before the device 710 contacts a top surface 722 of the buffer 720. The top surface 722 may be higher than a top surface 732 of the charging assembly 730. When the device 710 slides into the accommodating case, the device 710 may first contact the top surface 722 of the buffer 720. Further, at least a portion of the buffer 720 may be compressed and the buffer 720 may change to a compressed state (e.g., a buffer 720' indicated in dotted lines). Then the movement speed of the device 710 may be reduced by the buffer 720 before the device 710 contacts the top surface 732 of the charging assembly 730. In such cases, the impact caused by the device 710 may be reduced, thereby reducing or avoiding damage to the device 710 and/or the charging assembly 730. In some embodiment, the device 710 may still move at a certain speed after passing through the buffer 720 such that the charging assembly 730 may be plugged into a charging port of the device 710. Optionally or additionally, when the charging assembly 730 is plugged into the charging port of the device 710, the charging assembly 730 may be compressed by the device 710 due to the elastic support of the charging assembly 730. Then the charging assembly 730 may change to a compressed state (e.g., a charging assembly 730' indicated in dotted lines).

It should be noted that the example illustrated in FIG. 6 and the above description thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A charging apparatus for a device that includes a charging port, the charging apparatus comprising:
    an accommodating case with an opening at a surface of the accommodating case, the opening being configured such that the device is capable of sliding into the accommodating case through the opening;
    a charging assembly disposed within the accommodating case, wherein when the device slides into the accommodating case through the opening,
        if a side of the device with the charging port faces the charging assembly, at least a portion of the charging assembly is capable of being plugged into the charging port; or
        if a side of the device without the charging port faces the charging assembly, the charging assembly is capable of being compressed by the device; and
    a base assembly connected to a bottom of the accommodating case, wherein the charging assembly is supported by the base assembly.

2. The charging apparatus of claim 1, wherein the charging assembly is elastically supported by the base assembly such that at least a portion of the charging assembly is capable of extending out of a surface of the base assembly.

3. The charging apparatus of claim 1, wherein the charging assembly is elastically supported by the base assembly such that the charging assembly is capable of retracting into the base assembly when being compressed by the device.

4. The charging apparatus of claim 1, wherein the base assembly includes a guiding component, wherein the charging assembly penetrates through the guiding component and is movable relative to the guiding component.

5. The charging apparatus of claim 4, wherein the base assembly further includes a connecting component connected to a bottom of the guiding component and the bottom of the accommodating case, respectively.

6. The charging apparatus of claim 1, wherein the base assembly further includes an elastic component configured to elastically connect the charging assembly and the base assembly.

7. The charging apparatus of claim 6, wherein the elastic component includes one or more elastic units, and for each of the one or more elastic units, one end of the elastic unit contacts the charging assembly and another end of the elastic unit contacts the connecting component.

8. The charging apparatus of claim 6, wherein the base assembly includes a positioning assembly configured to fix a position of the elastic component relative to the connecting component.

9. The charging apparatus of claim 1, further comprising a buffer assembly configured to change a movement speed of the device.

10. The charging apparatus of claim 9, wherein an energy absorption of the buffer assembly is in range of 2-5 Joules.

11. The charging apparatus of claim 9, wherein a stroke of the buffer assembly is in range of 8-12 millimeters.

12. The charging apparatus of claim 1, wherein a distance between an inner wall of the accommodating case and a side surface of the device is in range of 0.2-1.2 millimeters.

13. The charging apparatus of claim 12, further comprising a protective assembly disposed on the inner wall of the accommodating case, wherein the protective assembly is configured to reduce an abrasion of the device when the device moves relative to the accommodating case.

14. The charging apparatus of claim 1, further comprising a switch assembly, wherein the switch assembly is operable by the device to turn on the charging assembly.

15. The charging apparatus of claim 1, wherein the device includes a flat panel detector.

16. A medical system comprising a charging apparatus for a device that includes a charging port, wherein the charging apparatus includes:
    an accommodating case with an opening at a surface of the accommodating case, the opening being configured such that the device is capable of sliding into the accommodating case through the opening;
    a charging assembly supported within the accommodating case, wherein when the device slides into the accommodating case through the opening,
        if a side of the device with the charging port faces the charging assembly, at least a portion of the charging assembly is capable of being plugged into the charging port; or if a side of the device without the charging port faces the charging assembly, the charging assembly is capable of being compressed by the device; and a buffer assembly configured to change a movement speed of the device.

17. The system of claim 16, further comprising a medical device, wherein the charging apparatus is attached to the medical device.

18. The system of claim 17, wherein the medical device includes a mobile digital radiography device.

19. The system of claim 16, further comprising a power supply assembly configured to supply power to the charging apparatus, wherein the power supply assembly is removably attached to the medical device.

* * * * *